(12) United States Patent
Ostwald et al.

(10) Patent No.: US 7,230,791 B1
(45) Date of Patent: Jun. 12, 2007

(54) RACK-MOUNTED STORAGE LIBRARY HAVING SEGMENTED PANEL ASSEMBLIES

(75) Inventors: Timothy C. Ostwald, Louisville, CO (US); Joseph Paul Manes, Arvada, CO (US); Daniel J. Plutt, Superior, CO (US); Jon Benson, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 517 days.

(21) Appl. No.: 10/728,133

(22) Filed: Dec. 4, 2003

(51) Int. Cl.
*G11B 15/68* (2006.01)
*G11B 17/04* (2006.01)
*G11B 17/22* (2006.01)

(52) U.S. Cl. .................. 360/92; 369/30.39; 369/30.41; 720/654

(58) Field of Classification Search .................. 360/92; 369/30.39, 30.41, 30.42, 30.52, 30.53, 30.54, 369/30.77, 30.78; 720/654
See application file for complete search history.

(56) References Cited

U.S. PATENT DOCUMENTS

| | | | | |
|---|---|---|---|---|
| 4,864,511 A * | 9/1989 | Moy et al. | ..................... | 360/92 |
| 5,206,814 A * | 4/1993 | Cahlander et al. | ............ | 360/92 |
| 5,253,246 A | 10/1993 | Leonhardt et al. | | |
| 5,274,516 A * | 12/1993 | Kakuta et al. | ................. | 360/92 |
| 5,285,333 A | 2/1994 | Barr et al. | | |
| 5,442,500 A * | 8/1995 | Hidano et al. | ................. | 360/92 |
| 5,455,810 A | 10/1995 | Luffel | | |
| 5,544,146 A | 8/1996 | Luffel et al. | | |
| 5,781,367 A * | 7/1998 | Searle et al. | ................... | 360/92 |
| 5,870,245 A | 2/1999 | Kersey et al. | | |
| 5,940,356 A | 8/1999 | Toumbas | | |
| 6,038,099 A * | 3/2000 | Heinze et al. | ................. | 360/92 |
| 6,120,230 A * | 9/2000 | Brown | ........................ | 360/92 |
| 6,309,162 B1 | 10/2001 | White | | |
| 6,441,991 B2 | 8/2002 | Ostwald et al. | | |
| 6,515,822 B1 | 2/2003 | White et al. | | |
| 2004/0105187 A1* | 6/2004 | Woodruff et al. | ............. | 360/92 |
| 2004/0165489 A1* | 8/2004 | Goodman et al. | ............ | 360/92 |
| 2005/0036230 A1* | 2/2005 | Dickey et al. | ................ | 360/92 |

* cited by examiner

*Primary Examiner*—Craig A. Renner
(74) *Attorney, Agent, or Firm*—Brooks Kushman P.C.

(57) ABSTRACT

The capacity of a rack-mounted storage library having a media element handling assembly is expanded by mounting a panel segment to a rack side such that the panel segment faces the rack interior. At least one of media element housing cells and a media player are supported on the panel segment such that the cells and the player face the rack interior. The library capacity is increased by mounting another panel segment having cells or a player to another rack side. The panel segments are mounted to the rack sides independent of one another or are connected together prior to being mounted to the rack sides. The handling assembly moves through the rack interior to load media elements held by cells into a player. The panel segments may be mounted to the rack sides at the same or different rack length positions.

8 Claims, 9 Drawing Sheets

RACK-MOUNTED STORAGE LIBRARY HAVING SEGMENTED PANEL ASSEMBLIES

BACKGROUND OF THE INVENTION

1. Field of the Invention

The present invention relates generally to rack-mounted storage libraries for handling and storing media elements such as cartridges and for reading and writing to the media elements using media element players such as drives. More particularly, the present invention relates to a rack-mounted storage library having a robot assembly operable for moving through the rack interior in order to handle media elements supported by the rack in which the capacity of the storage library is expanded by mounting segmented storage library panel assemblies formed of tear-apart panel segments to the rack with such panel segments supporting media elements and/or media element players.

2. Background Art

An automated data storage library generally includes media storage elements such as cartridges, media element players such as drives, and media element handling hardware such as a media element handling robot assembly. The library includes individual cells which hold respective cartridges. The robot assembly includes a picker which is operable to move about the library and manipulate cartridges held in the cells. The picker is generally operable to remove cartridges from the cells and drives in the library and load the cartridges into the cells and the drives.

Certain storage library designs such as rack-mounted storage libraries enable the libraries to be expandable for capacity upgrades. Many rack-mounted storage library expansion solutions require complex installation techniques at the library user's site. Some solutions require costly robot assembly duplication, while other solutions require skilled personnel to link existing robot assemblies with the expansion mechanics.

For example, a capacity upgrade may involve adding more storage library modules in a stacked configuration with pass through robotics connecting the individual enclosures of the storage library modules. Other solutions offer a capacity improvement that involves adding additional guide ways (rails) for robot assembly hardware already existing in the storage library. The new guide ways enable the picker to access new slots. In both cases, it is a problem to add capacity to the storage library because additional robot assembly hardware is required. It would be desirable if storage library capacity expansion did not require manipulation, addition, modification, etc., to the robot assembly already part of the storage library.

U.S. Pat. No. 5,870,245 discloses an example of a rack-mounted storage library which suffers from the problem of requiring additional robot assembly hardware to accommodate capacity upgrades. The capacity of the disclosed storage library is expanded by inserting additional storage library modules into the rack of the storage library. Each additional storage library module increases the storage library capacity by adding more cartridges and/or drives.

Each storage library module includes a drive shaft for moving a picker. The rear of the enclosures form a U-shaped channel for receiving a pulley system. The pulley system moves the picker to and from the drive shafts of the storage library modules in order to move the picker amongst the storage library modules. As such, adding additional storage library modules necessitates adding additional robot assembly hardware. In this case, adding additional drive shafts is needed to accommodate the additional storage library modules.

U.S. Pat. No. 6,515,822 discloses another example of a rack-mounted storage library which suffers from the problem of requiring additional robot assembly hardware to accommodate capacity upgrades. This disclosed storage library includes storage library modules vertically stacked on top of one another or vertically stacked in a rack. A linkage mechanism extends through the storage library modules. The linkage mechanism movably supports a robot assembly through a channel formed by the storage library modules. As such, the linkage mechanism is robot assembly hardware. The capacity of this disclosed storage library is also expandable by stacking additional storage library modules and/or inserting additional storage library modules into the rack. Either of these techniques necessitates replacing the original linkage mechanism with another (typically longer) linkage mechanism and/or necessitates adding another linkage mechanism to the original linkage mechanism.

A related problem with such rack-mounted storage library expansion solutions is that the capacity upgrades are not cost effective. For example, the storage library of U.S. Pat. No. 5,870,245 is expandable by inserting additional storage library modules into the rack of the storage library. Each of these storage library modules includes, in addition to cartridges and/or drives, a power supply, controller I/O circuitry, operator panels, and robot assembly hardware. A metal enclosure houses all of these elements. Such storage library modules cost more than storage library modules having cartridges and/or drives while being void of the other elements such as robot assembly hardware, power supplies, a metal enclosure having enough structure to support these elements, etc.

Thus, it would be more economical if capacity upgrades to the storage library were done using storage library expansion panels having cartridges and/or drives with the functions of the other elements such as robot assembly hardware, power supplies, operator panels, controllers, etc., being handled by elements already supported within the rack. Such storage library expansion panels having only cartridges and/or drives would weigh less than the disclosed storage library modules of U.S. Pat. No. 5,870,245. As a result, the rack of the storage library would not require welds or rivets to support such storage library expansion panels and further would not require as much structure to support the storage library expansion panels as opposed to that required by the storage library rack disclosed in U.S. Pat. No. 5,870,245.

SUMMARY OF THE INVENTION

Accordingly, it is an object of the present invention to provide a rack-mounted storage library having a robot assembly operable for moving through the storage library in order to handle media elements supported by the rack in which the capacity of the storage library is expanded by adding segmented storage library panel assemblies to the rack with such panel assemblies supporting media elements and/or media element players.

It is another object of the present invention to provide a rack-mounted storage library having a robot assembly operable for moving through the rack interior in order to handle media elements supported by the rack in which the capacity of the storage library is expanded by adding segmented storage library panel assemblies formed of tear-apart panel segments to the rack with such panel segments supporting media elements and/or media element players.

It is a further object of the present invention to provide a segmented storage library panel assembly supporting media elements and/or media element players for use in a rack-mounted storage library.

It is still another object of the present invention to provide a segmented storage library panel assembly formed of tear-apart panel segments which support media elements and/or media element players for use in a rack-mounted storage library.

It is still a further object of the present invention to provide a rack-mounted storage library having a power supply, a controller, and a robot assembly supported in the rack in which the rack is configured to receive and support segmented storage library panel assemblies which support media elements and/or media element players and are void of power supplies, controllers, and robot assembly hardware and in which the power supply, the controller, and the robot assembly supported in the rack provide their associated functions to such panel assemblies received by the rack.

It is still yet another object of the present invention to provide a rack-mounted storage library which accommodates segmented storage library panel assemblies having media elements and/or media element players and being void of robot assembly hardware in order to economically expand the capacity of the storage library during its lifetime.

In carrying out the above objects and other objects, the present invention provides a rack-mounted storage library having a rack, a media element handling assembly, a first panel segment, and a first set of media element housing cells. The first panel segment has an inner surface and is mounted to one side of the rack at a first rack length position such that the inner surface of the first panel segment faces the rack interior. The first set of media element housing cells are supported on the inner surface of the first panel segment such that these cells face the rack interior at the first rack length position. The media element handling assembly is operable for moving through the rack interior to move to the first rack length position in order to manipulate media elements held by the first set of media element housing cells.

The storage library may further include a second panel segment and a second set of media element housing cells. The second panel segment has an inner surface and is mounted to a second side of the rack at the first rack length position (or a second rack length position) such that the inner surface of the second panel segment faces the rack interior. The second set of media element housing cells are supported on the inner surface of the second panel segment such that these cells face the rack interior at the first rack length position (or at the second rack length position). The media element handling assembly is operable for moving through the rack interior to move to the first rack length position (and the second rack length position) in order to manipulate media elements held by the first and second sets of media element housing cells.

In addition, the storage library may further include a third panel segment and a media element player. The third panel segment has an inner surface and is mounted to a third side of the rack at the first rack length position such that the inner surface of the third panel segment faces the rack interior. The media element player is supported on the inner surface of the third panel segment such that the media element player faces the rack interior at the first rack length position. The media element handling assembly is operable for moving through the rack interior to move to the first rack length position in order to load media elements held by the first and second sets of media element housing cells into the media element player.

The first, second, and third panel segments may be mounted to the respective rack sides independent of one another. Alternatively, the first, second, and third panel segments are connected together independent of the mounting with the respective rack sides.

A media element player may be supported on the inner surface of the first panel segment such that the media element player faces the rack interior at the first rack length position. In this case, the media element handling assembly is operable for moving through the rack interior to move to the first rack length position in order to load media elements held by the first set of media element housing cells into the media element player.

Further, in carrying out the above objects and other objects, the present invention provides a method for forming a storage library provided with a rack. The storage library is further provided with a media element handling assembly operable for moving through the rack interior to manipulate media elements held by media element housing cells facing the rack interior. The method includes supporting a first set of media element housing cells on an inner surface of a first panel segment. The method further includes mounting the first panel segment to a first side of the rack at a first rack length position such that the first set of media element housing cells face the rack interior at the first rack length position.

The method may also include supporting a second set of media element housing cells on an inner surface of a second panel segment. In this case, the method further includes mounting the second panel segment to a second side of the rack at the first rack length position such that the second set of media element housing cells face the rack interior at the first rack length position.

The media element handling assembly may be operable for moving through the rack interior to load media elements held by the first and second sets of media element housing cells into a media element player facing the rack interior. In this case, the method may further include supporting a media element player on an inner surface of a third panel segment, and then mounting the third panel segment to a third side of the rack at the first rack length position such that the media element player faces the rack interior at the first rack length position. The first, second, and third panel segments may be connected together prior to being mounted with the respective rack sides.

Also, in carrying out the above objects and other objects, the present invention provides a storage library panel assembly for a rack-mounted storage library provided with a rack and a media element handling assembly operable for moving through the rack interior. The panel assembly includes a first panel segment having an inner surface. The first panel segment is mountable to a side of the rack such that the inner surface of the first panel segment faces the rack interior when the first panel segment is mounted to the side of the rack. A first set of media element housing cells are supported on the inner surface of the first panel segment such that these cells face the rack interior when the first panel segment is mounted to the side of the rack.

The panel assembly may further include a second panel segment having an inner surface. The second panel segment is mountable to another side of the rack such that the inner surface of the second panel segment faces the rack interior when the second panel segment is mounted to the other side of the rack. A second set of media element housing cells are supported on the inner surface of the second panel segment such that these cells face the rack interior when the second panel segment is mounted to the other side of the rack. Alternatively, a media element player is supported on the inner surface of the second panel segment such that the media element player faces the rack interior when the second panel segment is mounted to the other side of the rack. The first and second panel segments are connected together independent of the mounting with the respective rack sides.

Furthermore, in carrying out the above objects and other objects, the present invention provides a rack-mounted storage library having a rack, a media element handling assembly, a first panel segment, and a first set of media element housing cells. The rack has a vertically upright, rectangular form formed by top and bottom rack portions and four legs extending therebetween. The legs are placed at respective corners of the top and bottom rack portions and form a rectangular interior within the rack bounded by four rack sides. The media element handling assembly is movably connected to the rack for moving through the rack interior. The first panel segment has an inner surface. The first panel segment is mounted to one side of the rack at a first rack length position such that the inner surface of the first panel segment faces the rack interior. The first panel segment is void of hardware for moving the media element handling assembly. The first set of media element housing cells are supported on the inner surface of the first panel segment such that these cells face the rack interior at the first rack length position. The media element handling assembly moves through the rack interior to move to the first rack length position in order to manipulate media elements held by the first set of media element housing cells.

This storage library may further include a second panel segment having an inner surface. The second panel segment is mounted to any one of the rack sides at a second rack length position such that the inner surface of the second panel segment faces the rack interior. The second panel segment is void of hardware for moving the media element handling assembly. A media element player is supported on the inner surface of the second panel segment such that the media element player faces the rack interior at the second rack length position. The media element handling assembly moves through the rack interior to move to the first and second rack length positions in order to load media elements held by the first set of media element housing cells into the media element player.

Additionally, in carrying out the above objects and other objects, the present invention provides another rack-mounted storage library having a rack, a media element handling assembly, and a first set of media element housing cells. The rack has a door being operable for opening to expose the rack interior along a first side of the rack and being operable for closing to have an inner surface of the door face the rack interior along the first side of the rack. The first set of media element housing cells are supported on the inner surface of the door at a first rack length position such that the first set of media element housing cells face the rack interior at the first rack length position when the door is closed. The media element handling assembly is operable for moving through the rack interior to the first rack length position in order to manipulate media elements held by the first set of media element housing cells.

In carrying out the above objects and other objects, the present invention provides another rack-mounted storage library. The rack of this storage library includes a cover sheet being operable for hanging over the rack to have an inner surface of the cover sheet face the rack interior along a first side of the rack. Media element housing cells are supported on the inner surface of the cover sheet at a first rack length position such that the media element housing cells face the rack interior at the first rack length position when the cover sheet is hung over the rack. The media element handling assembly is operable for moving through the rack interior to the first rack length position in order to manipulate media elements held by the first set of media element housing cells.

The advantages associated with the present invention are numerous. For instance, storage library expansion panels having cartridges and/or drives can be removably attached to the rack of the storage library to increase the capacity of the storage library. As a result, the capacity of the storage library can be increased economically. Further, as the storage library expansion panels are formed of tear-apart panel segments which support cartridges and/or drives, the configuration of the storage library panels and, consequently, the configuration of the rack-mounted storage library, can easily be customized as desired by the user.

DETAILED DESCRIPTION OF THE PREFERRED EMBODIMENT(S)

Figure 1:
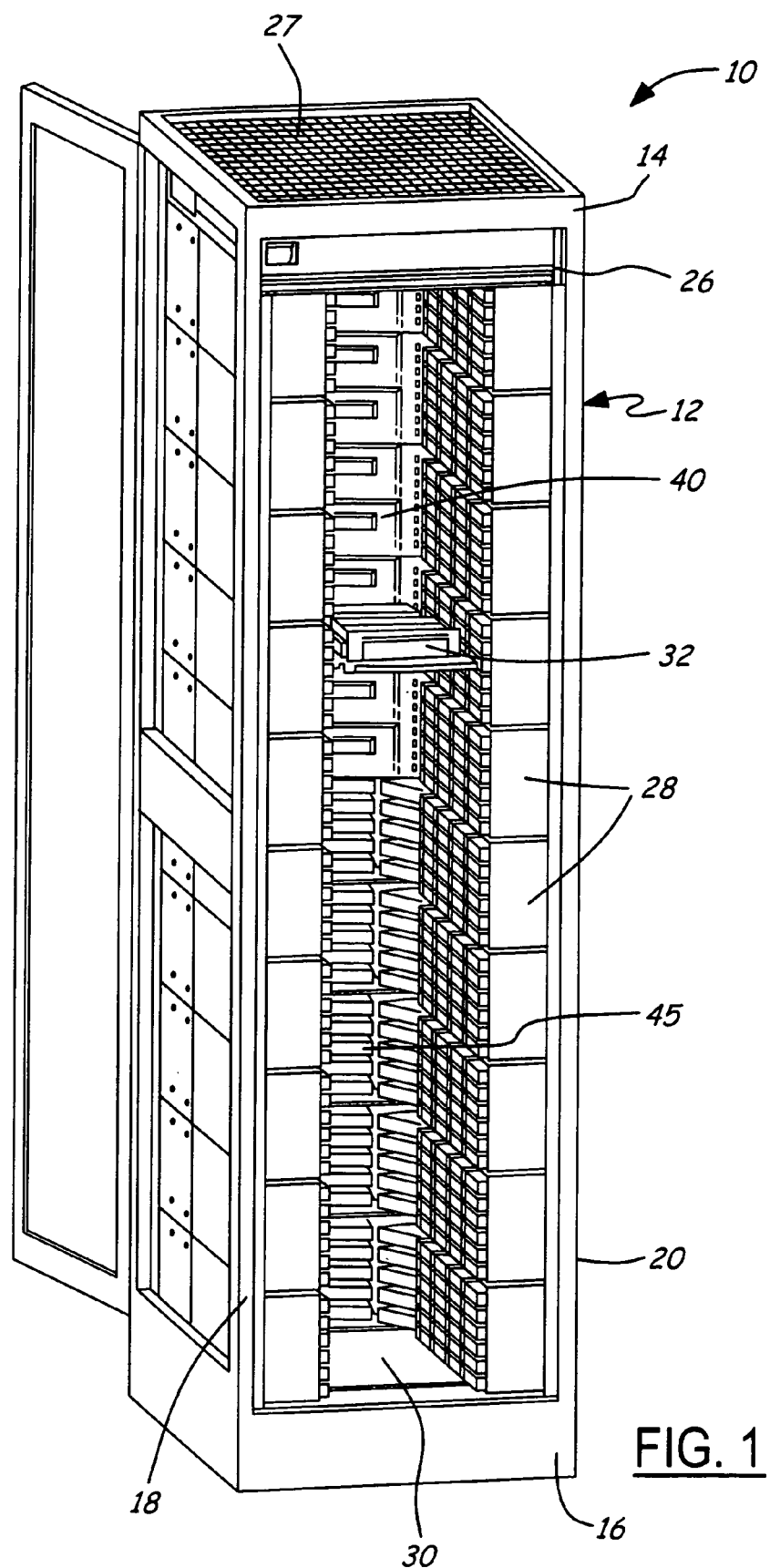
FIG. 1 illustrates a perspective view of a rack-mounted storage library in accordance with a preferred embodiment of the present invention.
Figure 2:
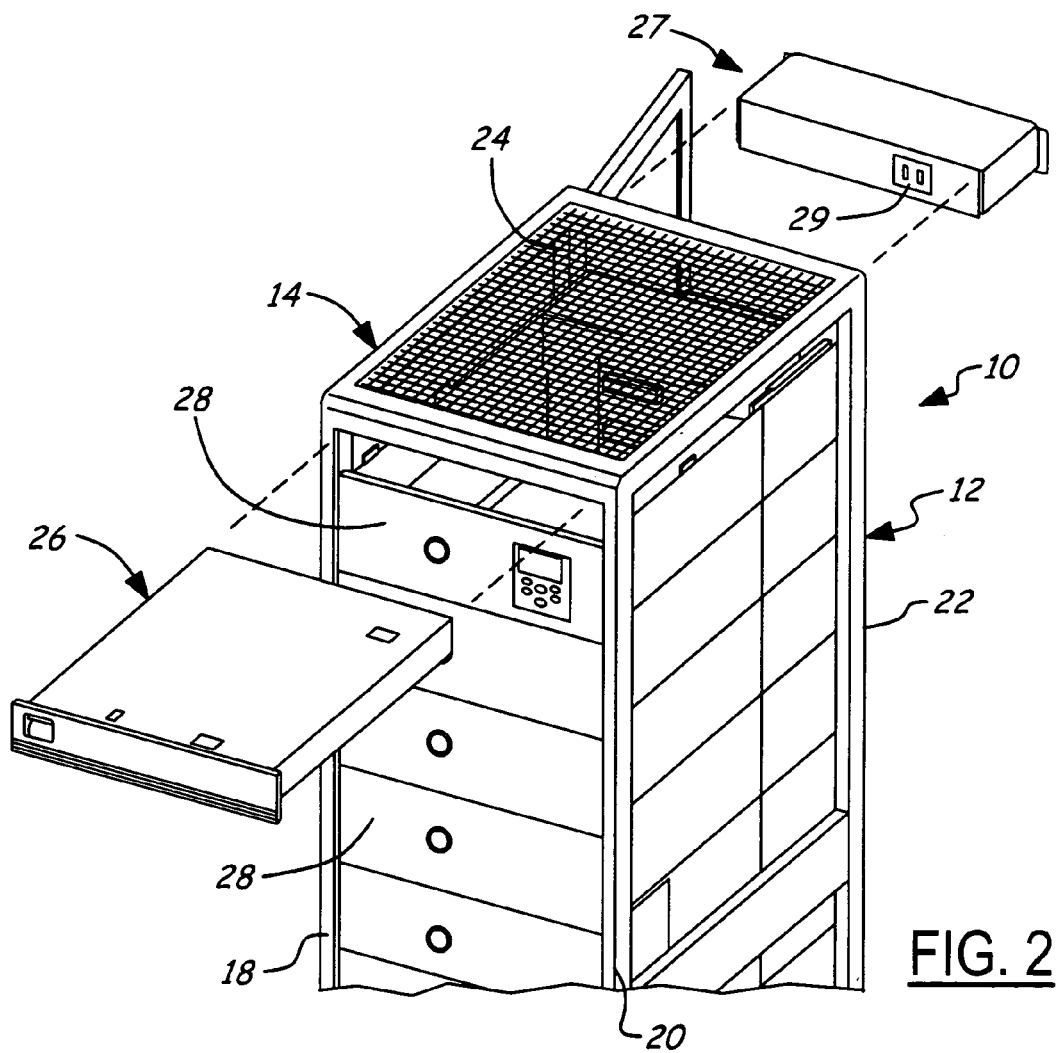
FIG. 2 illustrates a top view of the rack-mounted storage library with a self-contained robotics module and a controller module both being removed out of the rack of the storage library.

Referring now to FIGS. 1 and 2, a rack-mounted storage library 10 in accordance with a preferred embodiment of the present invention is shown. Storage library 10 is a data storage and retrieval system for a computer and is designed for handling and storing media elements such as cartridges and for reading and writing to the media elements using media element players as drives. A media element denotes any physical substrate suitable for storing data. A media element player is a reader and/or writer, i.e., a drive, which translates the data stored on a media element into signals readable by the computer for reading operations and/or writes data to the media element in response to a command from the computer for writing operations.

Storage library 10 includes a rack (e.g., frame) 12. Rack 12 has a vertically upright, rectangular form formed by top and bottom rack portions 14 and 16 and four legs 18, 20, 22, and 24 extending therebetween. Legs 18, 20, 22, and 24 are placed at respective corners of top and bottom rack portions 14 and 16 and provide rack 12 with a rack length. Legs 18, 20, 22, and 24 form a rectangular interior within rack 12 which is bounded by the sides of the rack. Each pair of legs forms a rack side such that rack 12 has four sides. Bottom rack portion 16 is placed on a support structure such as a floor to support the weight of storage library 10.

A self-contained media element handling robotics module 26 is positioned within the interior of rack 12 preferably adjacent to top rack portion 14. Robotics module 26 is an integrated replaceable unit which contains media element handling robotics. Robotics module 26 can be plugged into and plugged out of a spacing within rack 12 of storage library 10 in a modular manner. Robotics module 26 may be removed and installed from the front and back sides of rack 12 of storage library 10. As shown in FIG. 1, robotics module 26 is plugged into rack 12 within its respective spacing of the interior formed by the rack. As shown in FIG. 2, robotics module 26 is plugged out from rack 12. As such, robotics module 26 facilitates modular replacement and removal of the media element handling robotics into and out of storage library 10.

A power/controller module 27 is positioned within the interior of rack 12 preferably adjacent to both top rack portion 14 and robotics module 26 when the robotics module is positioned within the rack. Power/controller module 27 includes a power supply for supplying the power required by the media element handling robotics of robotics module 26. Power/controller module 27 includes control electronics for generating electrical control signals to control the operation of the media element handling robotics of robotics module 26. Power/controller module 27 can be plugged into and plugged out of its spacing within rack 12. As shown in FIG. 1, power/controller module 27 is plugged into rack 12 within its respective spacing. As shown in FIG. 2, power/controller module 27 is plugged out from rack 12.

Robotics module 26 and power/controller module 27 are electrically connected to one another when both modules are mounted in rack 12. Robotics module 26 and power/controller module 27 include corresponding self-mating plug-connectors 29 on their back sides which plug into one another in order to connect these modules together.

Storage library 10 includes a plurality of storage library panel assemblies 28. Storage library panel assemblies 28 are positioned within the interior of rack 12. Rack 12 receives each panel assembly 28 within a respective spacing provided by the rack. Panel assemblies 28 include media elements 45 such as cartridges and/or include media element players 40 such as drives. Cartridges 45 are individually supported within housing cells 42 in panel assemblies 28. Drives are individually supported within drive trays in panel assemblies 28. Drives 40 are operable to read and write data to cartridges 45 when the cartridges are loaded into the drives.

FIG. 1 illustrates storage library 10 having panel assemblies 28 positioned in each available panel assembly spacing provided by rack 12. Panel assemblies 28 are removably connected to sides of rack 12 and supported by legs 18, 20, 22, and 24. The connection between legs 18, 20, 22, and 24 and panel assemblies 28 may be such that the panel assemblies do not touch each other with rack 12 fully supporting the entire weight of the panel assemblies. Panel assemblies 28 do not support the weight of adjoining panel assemblies and can be independently removed out from and inserted into respective panel assembly spacings provided by rack 12.

As shown in FIG. 1, storage library panel assemblies 28 are in a vertical stack and form a continuous channel 30 along their height. Robotics module 26 is positioned above the vertical stack of panel assemblies 28. The capacity of storage library 10 may be expanded by inserting panel assemblies 28 into rack 12 of the storage library. Similarly, the capacity of storage library 10 may be reduced by removing panel assemblies 28 from rack 12 of the storage library.

Figure 3:
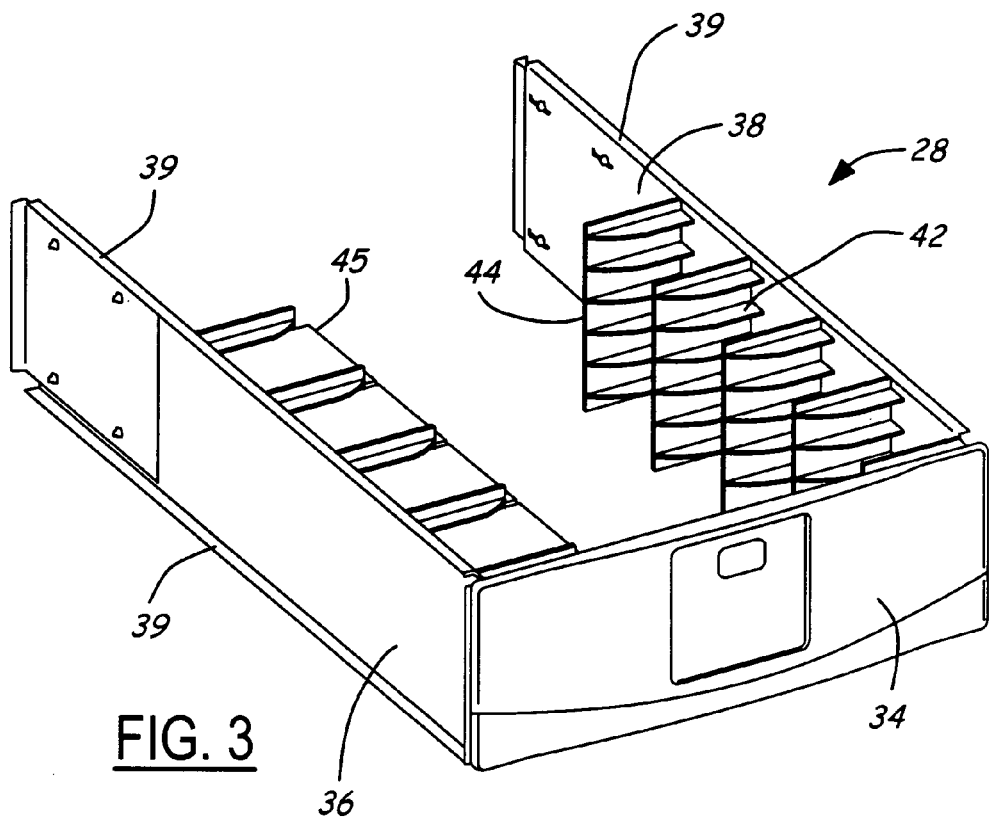
FIG. 3 illustrates an embodiment of a storage library expansion panel supporting media element holding cells in accordance with the present invention.

As shown in FIG. 1, panel assemblies 28 are plugged into rack 12 within respective spacings. As shown in FIG. 3, a panel assembly 28 is removed out from rack 12. As such, panel assemblies 28 facilitate modular removal and replacement of cartridges and drives into and out of rack 12 of storage library 10.

As indicated above, robotics module 26 includes media element handling robotics, i.e., a media element handling picker assembly 32. Picker assembly 32 is self-containable within robotics module 26. Picker assembly 32 is operable to drop out from robotics module 26 and then move amongst panel assemblies 28 by moving up-and-down through channel 30. Picker assembly 32 is operable to selectively grab a cartridge 45 from a cell 42 of one panel assembly 28 and then move this cartridge to another location in this panel assembly or to any location in the other panel assemblies.

In particular, picker assembly 32 is operable to move to a cell 42 holding a desired cartridge 45, engage the desired cartridge and remove it from its cell, move the desired cartridge to a location adjacent to a selected drive 40, and then load the desired cartridge into the selected drive. As noted above, drive 40 may be contained in a different panel assembly 28. In this event, picker assembly 32 moves up or down along channel 30 from panel assembly 28 containing the desired cartridge 45 to the panel assembly containing the desired drive 40. As such, picker assembly 32 is operable to grab a cartridge 45 from a first panel assembly 28 located at one end of the stack, move the cartridge along channel 30 to a second panel assembly 28 located at the other end of the stack, and load the cartridge into a drive 40 (or another cell) of the second panel assembly.

Figure 4:
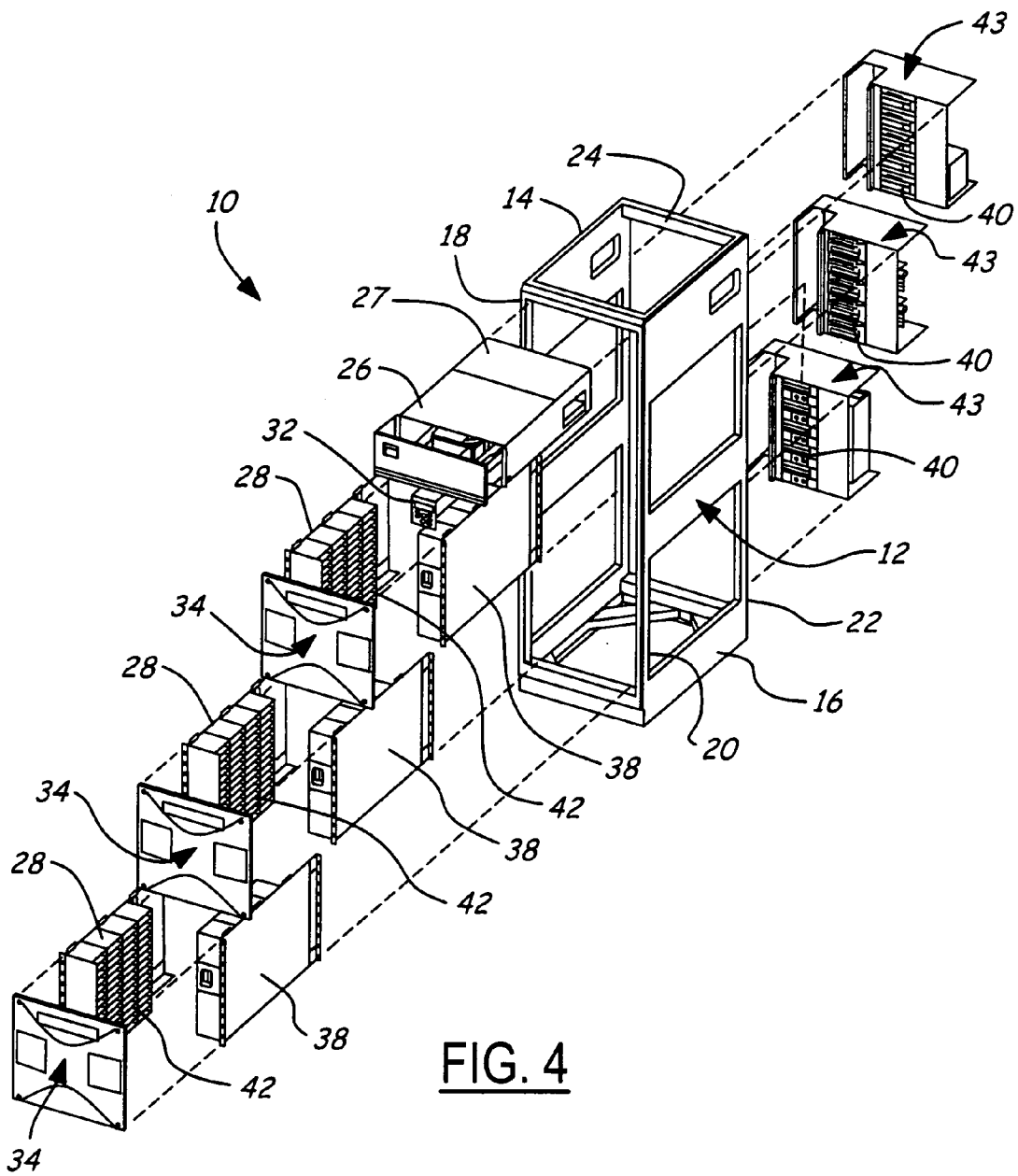
FIG. 4 illustrates an exploded view of the rack-mounted storage library.

Referring now to FIGS. 3 and 4, with continual reference to FIGS. 1 and 2, each panel assembly 28 may include a front panel segment 34 and two side panel segments 36 and 38. Panel segments 34, 36, and 38 are made of a sheet metal. Panel segments 34, 36, and 38 are configured to be interconnected to one another to assemble panel assembly 28 as one piece (as shown in FIG. 3) and to be torn-apart from one another to disassemble the panel assembly (as shown in FIG. 4). As such, each panel assembly 28 is segmented.

Side panel segments 36 and 38 include slides 39 which are configured to slide their associated panel assembly 28 into and out of corresponding slide supports of legs 18, 20, 22, and 24 in order to insert their associated panel assembly within the interior of rack 12. In the embodiment of panel assembly 28 shown in FIG. 3, panel assemblies 36 and 38 support media housing cell trays 44 secured to the interior surfaces of the panel segments. Cell trays 44 are made of plastic and may be individually connected to the interior surface of a panel segment. Each cell tray 44 includes an associated set of media housing cells 42 which are capable of holding respective cartridges 45.

As shown in FIG. 4, each panel assembly 28 may further include a rear panel segment 43 also made of a sheet metal. Rear panel segment 43 is configured to be torn-apart from side panel segments 36 and 38 to disassemble panel assembly 28 (as shown in FIG. 4) and is also configured to be connected to the panel segments in order to assemble the panel assembly as one piece. In the embodiment of panel assembly 28 shown in FIG. 4, rear panel segment 43 supports drive trays which are secured to the interior surface of the rear panel segment. Drive trays, which are also made of plastic and may be molded, are capable of holding respective drives 40.

The embodiment of panel assembly 28 as shown in FIGS. 3 and 4 is an example of a panel assembly containing both cartridges 45 (held by cells 42) and drives 40 (held by the drive trays). Other panel assemblies 28 may be configured to have only cartridges or only drives. To this end, panel segments 34, 36, 38, and 43 may be replaced with other panel segments which support the desired cartridge and drive arrangement. Furthermore, the sizes of the panel assemblies 28 and panel segments 34, 36, 38, and 43 are not limited to the illustrated sizes. For example, one or more of panel segments 34, 36, 38, and 43 may have a length equal to the rack length such that these panel segments cover entire rack sides when mounted to respective rack sides.

Panel assemblies 28 do not contain any media element handling robotics, power supplies, operator panels, control electronics, etc. Robotics module 26 provides the media element handling robotics (i.e., picker assembly 32) required for handling the cartridges in panel assemblies 28. Picker assembly 32 may include a reader for reading labels on cartridges 45 and drives 40 of panel assemblies 28 in order to keep track of the location of the contents of storage library 10.

Power/controller module 27 provides the power required for robotics module 26 and drives 40. Power/controller module 27 also provides the control electronics required for keeping track of the contents and operation process steps of storage library 10. To this end, picker assembly 32 may include a reader for reading labels on cartridges 45 and drives 40 of storage library panels 28 in order to keep track of the location of the contents of storage library 10.

As panel assemblies 28 only contain cartridges and/or drives and the panel assemblies are supported by rack 12, panel segments 34, 36, 38, and 43 can be made inexpensively. Accordingly, storage library 10 accommodates panel assemblies 28 having only cartridges and/or drives in order to economically expand the capacity of the storage library during its lifetime. To this end, storage library 10 includes a base module (i.e., robotics module 26 having picker assembly 32 and power/controller module 27) in rack 12 with the capacity of the storage library being expandable by receiving panel assemblies 28 which contain only cartridges and/or drives. Rack 12 supports the weight of panel assemblies 28 and the base module powers, accesses, and controls the cartridges and/or drives of the panel assemblies inserted into the rack.

Panel segments 34, 36, 38, and 43 may be interconnected together to form a panel assembly 28. The formed panel assembly 28 may then be plugged as one-piece into a spacing provided by rack 12 of storage library 10. An inserted panel assembly 28 may also be plugged out in one-piece from rack 12.

Alternatively, as panel segments 34, 36, 38, and 43 may be torn-apart from one another, the panel segments may be individually connected to rack 12. In this case, panel segments 34, 36, 38, and 43 may be individually connected to rack 12 at different times during the operation of storage library 10 with the storage library being fully functional with the cartridges 45 and drives 40 already supported in rack 12 during this time period. The torn-apart feature of panel segments 34, 36, 38, and 43 and cell trays 44 in combination with storage library 10 providing the associated robotic, power, and controller requirements, effectively enables panel assemblies 28 to be easily transported and knocked down into a stocked arrangement for later use in the storage library.

Figure 5:
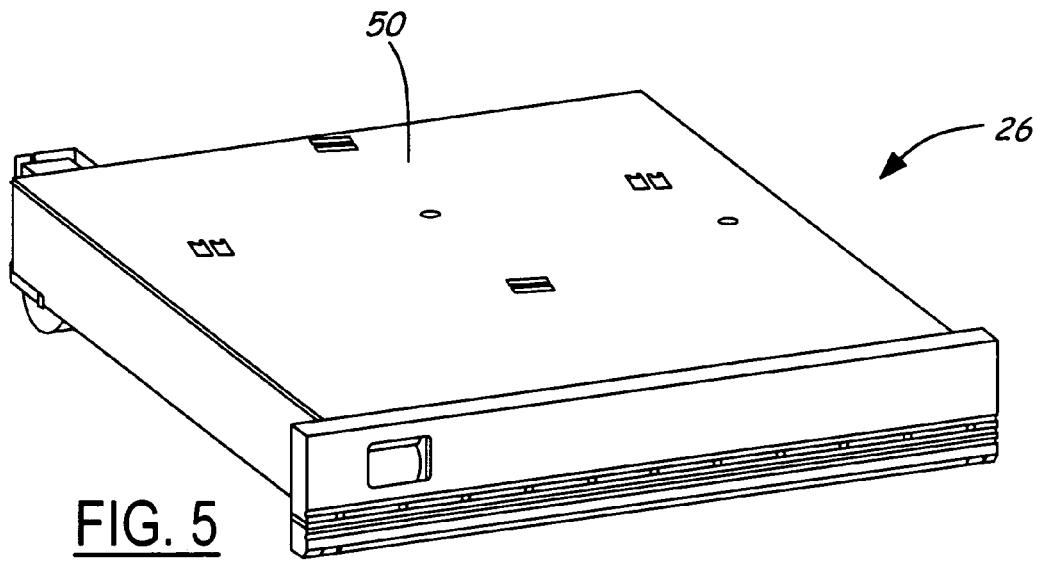
FIG. 5 illustrates a top-side perspective view of the self-contained robotics module in which a media element handling robot assembly is fully recessed within the robotics module and a communications cable is fully retracted within the robotics module.
Figure 6:
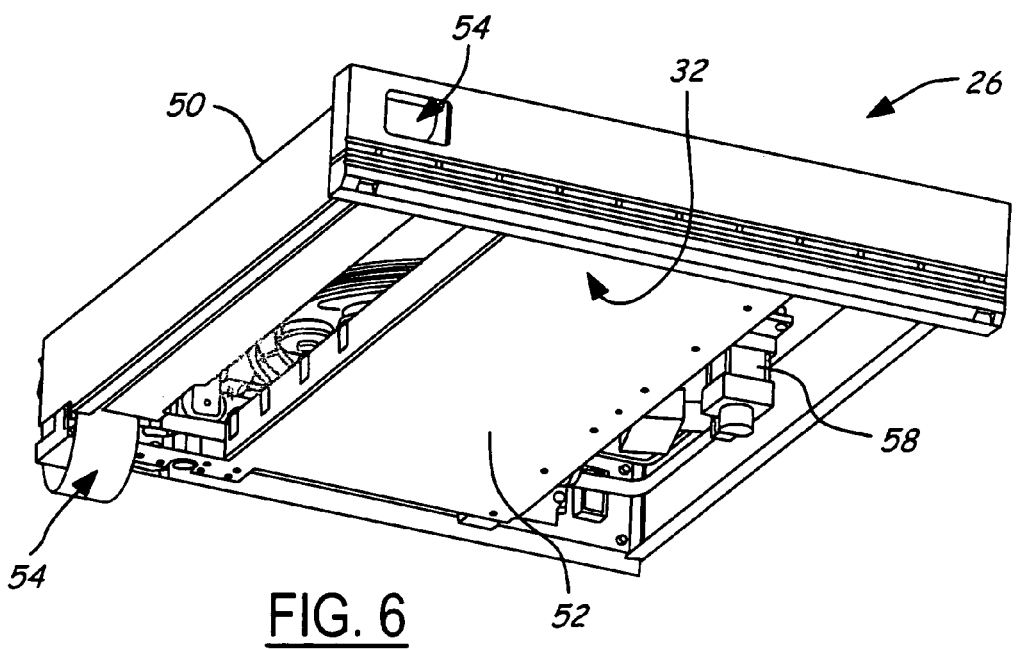
FIG. 6 illustrates a bottom-side perspective view of the self-contained robotics module with the media element handling robot assembly being fully recessed within the robotics module and the communications cable being fully retracted within the robotics module.

Referring now to FIGS. 5, 6, 7, 8, and 9, self-contained robotics module 26 will now be described in greater detail. FIGS. 5 and 6 respectively illustrate top and bottom side perspective views of robotics module 26. In FIGS. 5 and 6, picker assembly 32 is fully recessed within a housing 50 of robotics module 26 and an electronics communications cable 54 is fully retracted within the robotics module. Picker assembly 32 includes a platform 52. Platform 52 is shown in FIG. 6 as being fully recessed along a bottom-side of housing 50.

When picker assembly 32 is in the fully recessed position within housing 50 of robotics module 26 and communications cable 54 is fully retracted within the robotics module, the robotics module can be removably plugged into and pulled out from its respective spacing in rack 12 of storage library 10. Removing robotics module 26 from rack 12 of storage library 10 effectively removes all of the media element handling robotic assembly hardware out of storage library 10. Similarly, plugging robotics module 26 into rack 12 of storage library 10 effectively adds all of the media element handling robotic assembly hardware to the storage library.

Figure 7:
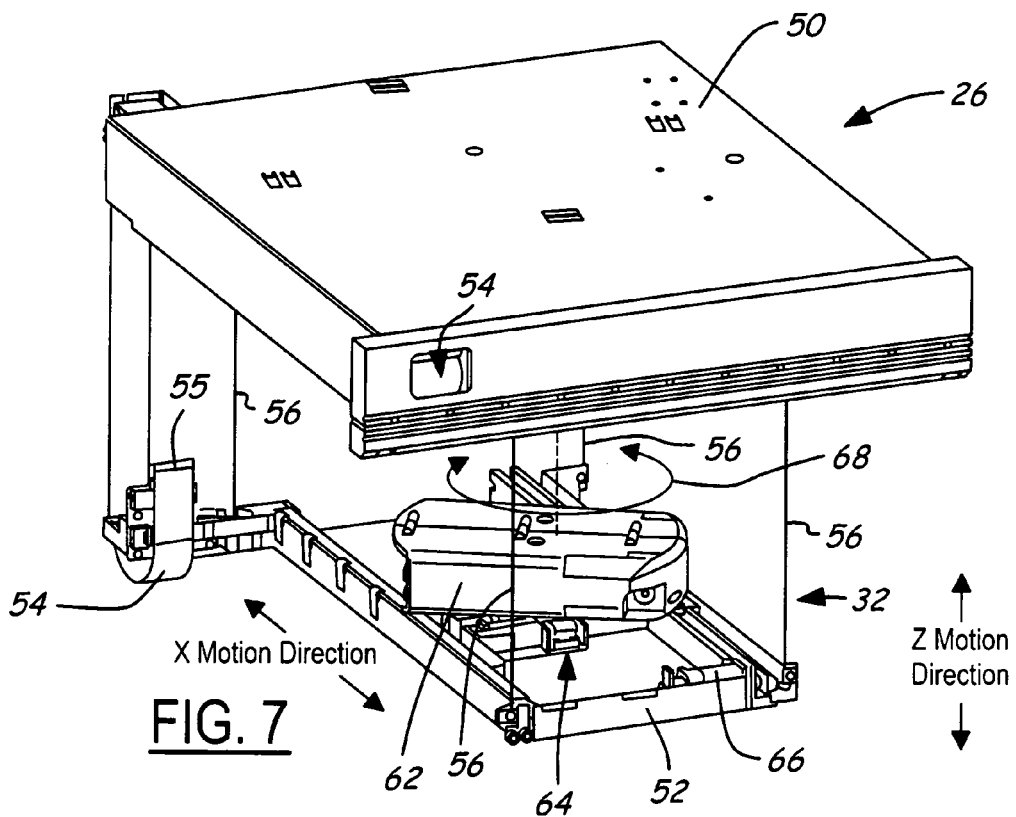
FIG. 7 illustrates a top-side perspective view of the robotics module with the media element handling robot assembly being moved out from its recessed position within the robotics module and the communications cable being extended out from the robotics module.
Figure 8:
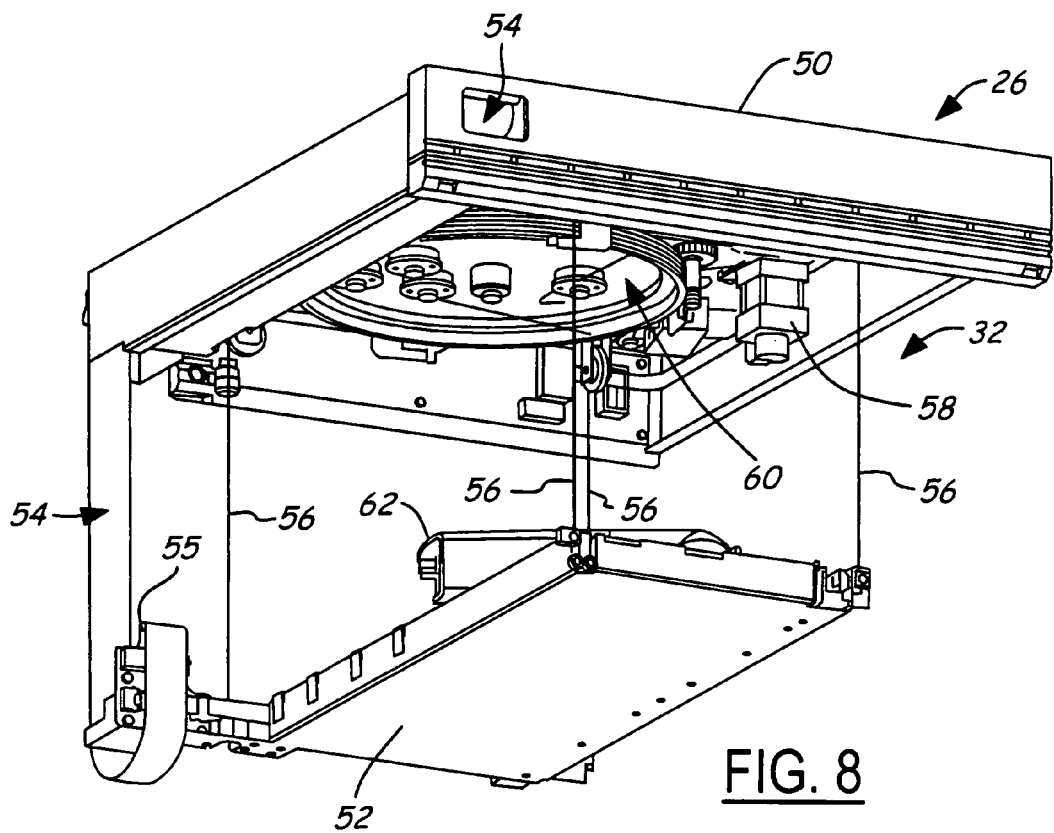
FIGS. 8 and 9 illustrate bottom-side perspective views of the robotics module with the media element handling robot assembly being moved out from its recessed position within the robotics module and the communications cable being extended out from the robotics module.
Figure 9:
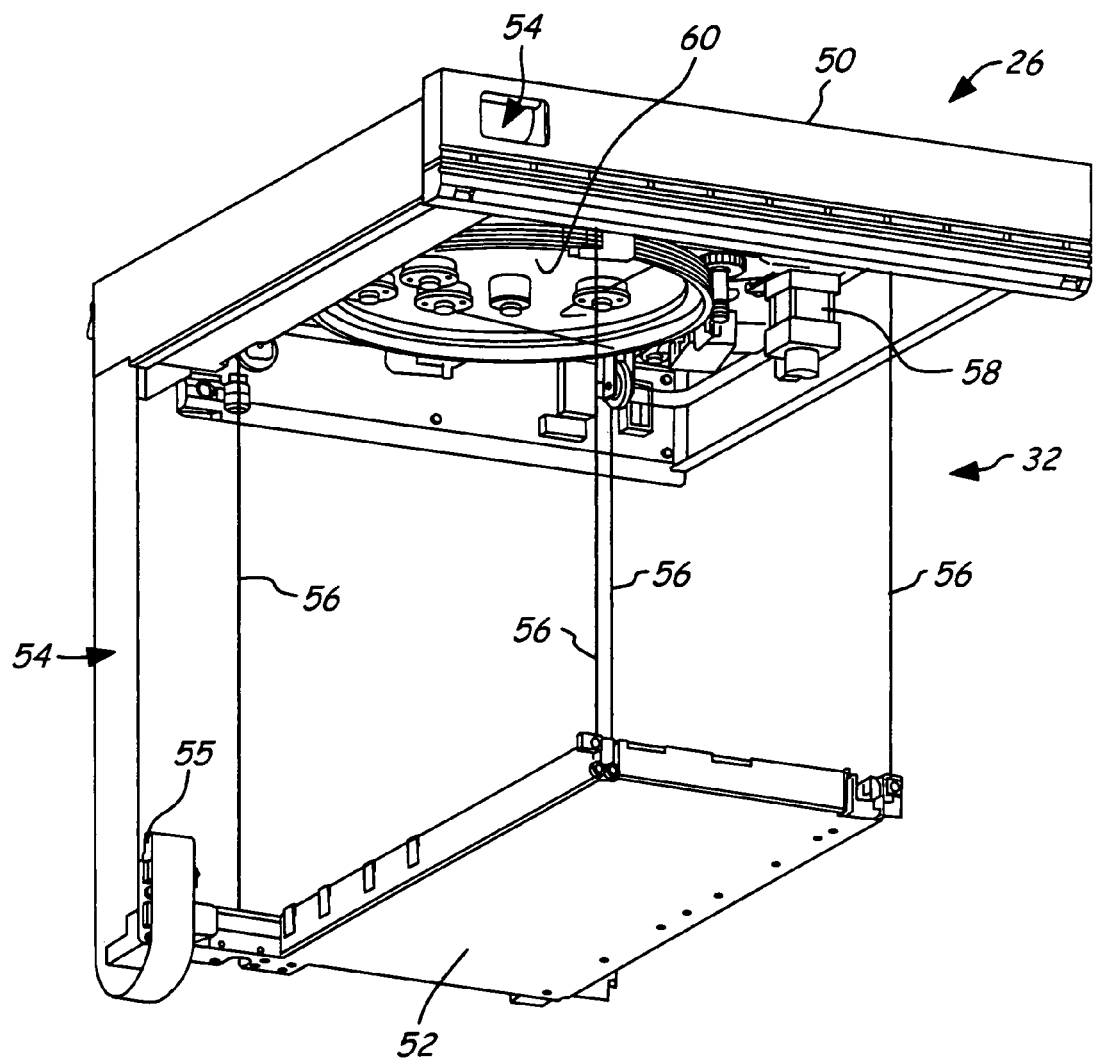

FIGS. 7, 8, and 9 illustrate top and bottom side perspective views of robotics module 26 with picker assembly 32 and its platform 52 being dropped down out from housing 50. A portion of communications cable 54 is extended out from robotics module 26. Communications cable 54 has a controller card connected at one end 55 to platform 52. As will be described in greater detail below, communications cable 54 enables electronic communication between an external device such as power/controller module 27 and picker assembly 32.

Picker assembly 32 includes four suspension cables 56 which are connected at each corner of platform 52. Suspension cables 56, such as steel rope cables, are fully wound up when platform 52 is fully recessed within housing 50. Suspension cables 56 unwind to lower platform 52 out from housing 50, and, as a result, the platform moves down along a z-direction as the suspension cables unwind. Similarly, platform 52 moves up along the z-direction as the suspension cables wind up from an unwound position.

Robotics module 26 includes a z-drive motor 58 for winding and unwinding suspension cables 56. Z-drive motor 58 drives a suspension cable wheel 60 in order to wind and unwind suspension cables 56. Suspension cables 56 are fully wound around wheel 60 when platform 52 is fully recessed within housing 50. Similarly, suspension cables 56 unwind from wheel 60 as platform 52 is lowered out from housing 50. Z-drive motor 58 is in communication with an external device such as power/controller module 27 for receiving commands to control the z-direction movement of platform 52.

Communications cable 54 releases from housing 50 of robotics module 26 as platform 52 is lowered out from the housing. As first end 55 of communications cable 54 is connected to platform 52, the platform pulls the communications cable out from housing 50 as the platform moves away from the housing in the z-direction along channel 30 formed by storage library panels 28. During operation, platform 52 will eventually move away from housing 50 to the extent of the maximum expansion of storage library 10, i.e., the platform will move to the lowest panel assembly 28 in the vertical stack. The maximum extension of platform 52 away from robotics module 26 sets the length of the portion of communications cable 54 extending out from housing 50 of the robotics module.

Picker assembly 32 further includes a picker hand assembly 62 supported on a carriage assembly 64 movably connected to platform 52. Carriage assembly 64 is movable in an x-direction of motion along platform 52. An x-drive motor 66 drives carriage assembly 64 to move the carriage assembly along the x-direction. Hand assembly 62 moves in the x-direction of motion as carriage assembly 64 moves along the x-direction. Via communications cable 54, x-drive motor 66 is in communication with an external device such as power/controller module 27 for receiving commands to control the x-direction movement of carriage assembly 64.

Hand assembly 62 is also supported on carriage assembly 64 to be rotatable in a wrist direction of motion 68. Via communications cable 54, hand assembly 62 is in communication with an external device such as power/controller module 27 for receiving commands to control the wrist direction movement of the hand assembly.

Accordingly, hand assembly 62 has three directions of motion. One, hand assembly 62 is rotatable in the wrist direction of motion 68. Two, carriage assembly 64 moves hand assembly 62 along the x-direction. Three, platform 52 moves hand assembly 62 along the z-direction.

Hand assembly 62 is movable in the z-direction of motion to travel up-and-down through channel 30 formed by panel assemblies 28 in order to move up-and-down amongst the panel assemblies and to move up-and-down amongst a particular panel assembly. Hand assembly 62 is movable in the x-direction of motion to move across a panel assembly. Hand assembly 62 is rotatable in the wrist direction of motion to move next to a cell and/or a drive in order to grab a cartridge from its cell and insert this cartridge into another cell and/or another drive.

As described, robotics module 26 contains a free-hanging media picker assembly 32. The free-hanging design of picker assembly 32 enables robotics module 26 to be self-contained. That is, there is no attachment at bottom rack portion 16 as would be required with a pulley system. Because picker assembly 32 has a free-hanging configuration, there is no complicated support or drive structure required for operation of the picker assembly. Accordingly, picker assembly 32 is not affected by capacity upgrades. For instance, adding capacity to storage library 10 entails adding cartridges and/or drives to the storage library but does not entail adding any more media element handling robotics hardware.

As a result, the capacity of storage library 10 can be expanded by simply adding panel assemblies 28, not having media element handling robotics, at a position below robotics module 26. As indicated above, communications cable 54 has a sufficient length to support the maximum extent of picker assembly 32 along channel 30 formed by storage library panels 28 and, consequently, has a sufficient length to support the capacity expansion of storage library 10.

It is further noted that storage library 10 may remain operational while robotics module 26 is removed from the storage library. For example, in this case, drives 40 may still function to read and write to cartridges 45 mounted within the drives while robotics module 26 is dismounted out of rack 12 of storage library 10.

Figure 10:
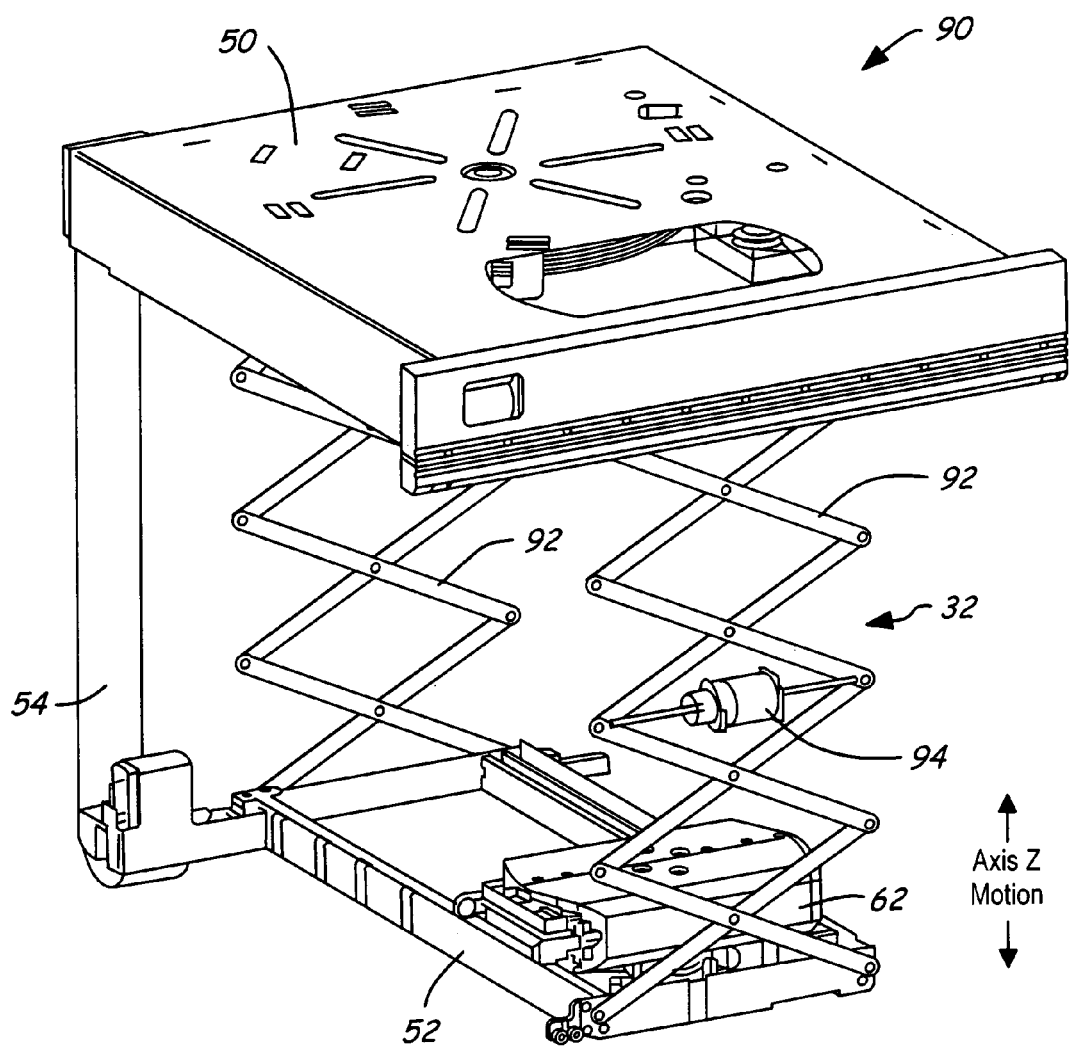
FIG. 10 illustrates a top-side perspective view of a self-contained robotics module in accordance with another embodiment with the media element handling robot assembly being moved out from its recessed position within the robotics module and the communications cable being extended out from the robotics module.

Referring now to FIG. 10, a top-side perspective view of a self-contained robotics module 90 in accordance with another embodiment is shown. Robotics module 90 includes many of the same elements as robotics module 26 and like components have the same reference numerals. In FIG. 10, picker assembly 32 is moved out from housing 50. Robotics module 90 includes two scissor mechanism legs 92 which are connected at each corner of platform 52. Legs 92 are fully contracted when platform 52 is fully recessed within housing 50. Legs 92 expand to lower platform 52 out from housing 50, and, as a result, the platform down moves along the z-direction as the legs expand. Similarly, platform 52 moves up along the z-direction as legs 92 contract from an expanded position. Robotics module 26 includes a z-drive actuator 94 for contracting and expanding legs 92.

It is noted that the configuration of robotics module 90 lends itself to be placed at other locations in rack 12 than being placed adjacent to top rack portion 14 as with robotics module 26. For instance, robotics module 90 may be effectively flipped upside down and placed near bottom rack portion 16. In this event, legs 92 expand to raise (as opposed to lower) platform 52 to move out from housing 50 and move upward (as opposed to downward) along the z-direction. Robotics module 90 may also be effectively placed on its side. In this case, legs 92 expand and contract to move side-to-side.

Figure 11:
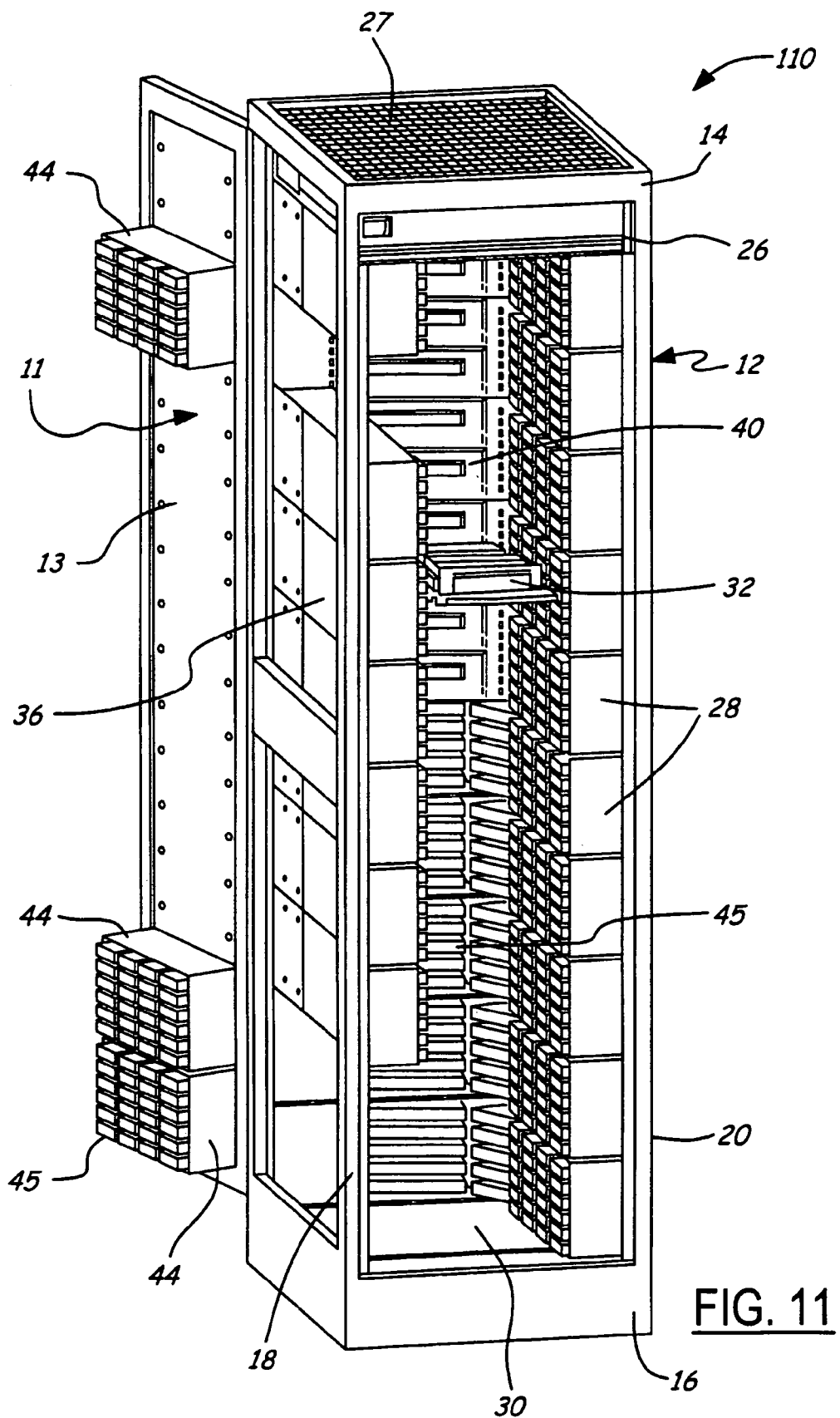
FIGS. 11 and 12 illustrate perspective views of the rack-mounted storage library in accordance with other embodiments of the present invention.
Figure 12:
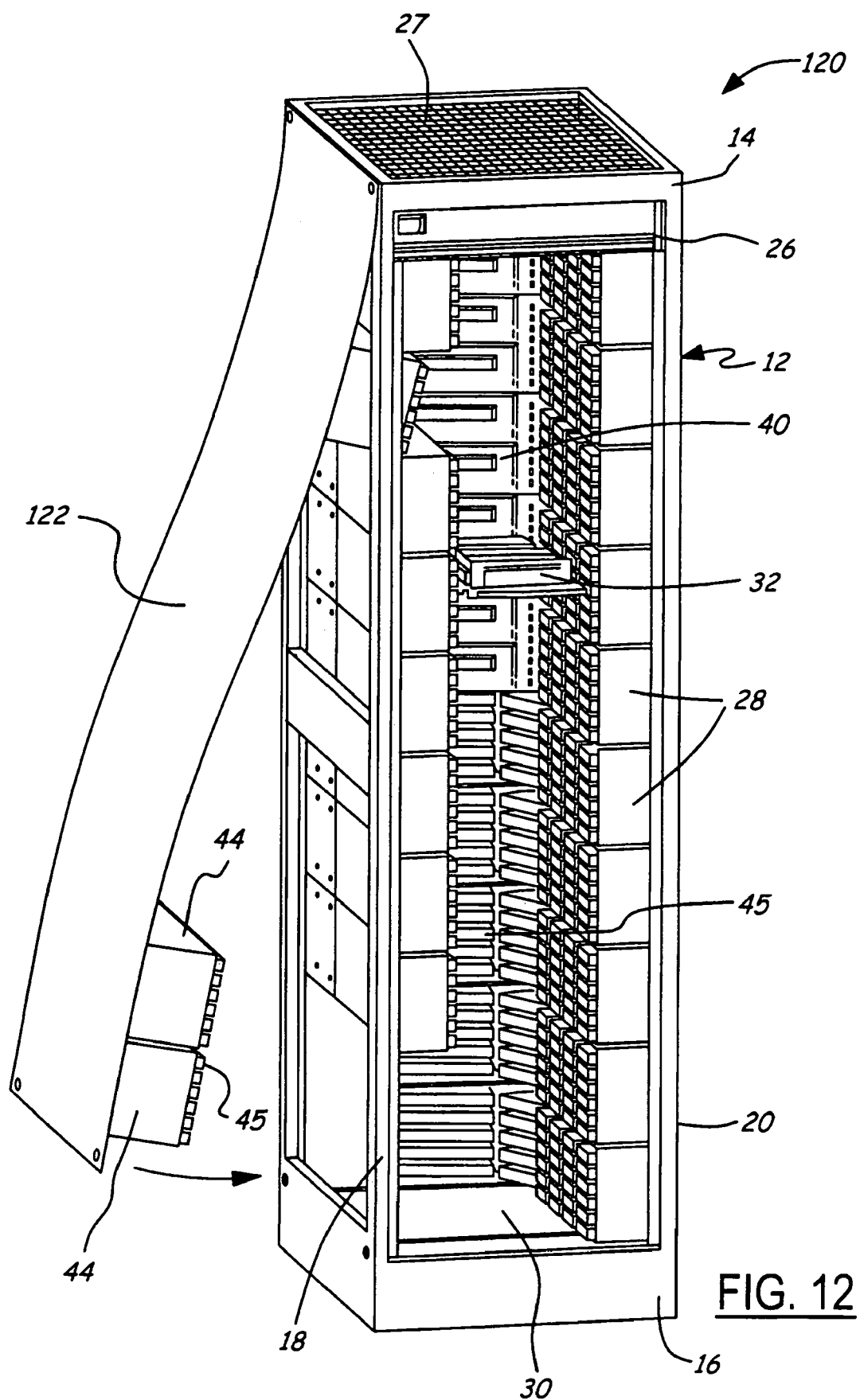

As described, panel segments 34, 36, 38, and 43 of panel assemblies 28 are mounted to the sides of rack 12 which are formed by the associated leg pairs of storage library 10. Panel segments 34, 36, 38, and 43 of such panel assemblies 28 support drive trays for drives 40 and cell trays 44 having cells 42 for cartridges 45. With reference to FIGS. 11 and 12, the drive trays and cell trays may be configured to mount directly to rack 12 instead of being supported to panel segments 34, 36, 38, and 43 mounted to the rack.

For example, as shown in FIG. 11, rack 12 of a rack-mounted storage library 110 in accordance with an embodiment of the present invention further includes a door 11 connected by hinges to leg 24. Door 11 opens and closes relative to the rack side formed by leg pair 18 and 24. Inner surface 13 of door 11 includes support structure such as hooks for supporting drive trays and cell trays 44. As such, different arrangements of drive and cell trays may be mounted to inner surface 13 of door 11. The drive and cell trays mounted to inner door surface 13 face the rack interior when the door is closed. In effect, inner door surface 13 provides the supporting structure for the drive and cell trays which was provided by the panel segments. In conjunction with the drive and cell trays mounted on inner door surface 13, panel segments having drive and cell trays may also be mounted to the same rack side at different rack length positions such that the drive and cell trays of these panel segments are positioned on the same rack side in areas left void by the drive and cell trays mounted to the door as shown in FIG. 11.

As shown in FIG. 12, rack 12 of a rack-mounted storage library 120 in accordance with an embodiment of the present invention may include a cover sheet 122 made of plastic, cloth, or the like for each respective rack side. For example, rack 12 may include three rack cover sides for each of the three rack sides formed by leg pairs 18 and 20, leg pairs 20 and 22, and leg pairs 22 and 24 in conjunction with door 11 for the remaining rack side. Cover sheet 122 is connected to top rack portion 14 at one end to hang down over the respective rack side. Cover sheet 122 generally has a length sufficiently sized to cover the respective rack side over its entire rack length, but may have shorter lengths. Cover sheet 122 may have snaps or the like to snap onto the rack legs. Like door 11, cover sheet 122 has an inner surface which include support structure such as hooks and the like for supporting drive trays and cell trays 44.

Again, different arrangements of drive and cell trays may be mounted to the inner surface of cover sheet 122. Such drive and cell trays mounted to the inner surface of cover sheet 122 face the rack interior when the cover sheet is hung down over the respective rack side. In conjunction with the drive and cell trays mounted on the inner surfaces of cover sheet 122, panel segments having drive and cell trays may also be mounted to the same rack sides such that the drive and cell trays of these panel segments are positioned on the same rack sides in areas left void by the drive and cell trays mounted to the cover sheet as shown in FIG. 12.

Thus, it is apparent that there has been provided, in accordance with the present invention, a rack-mounted storage library having panel assemblies that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A rack-mounted storage library comprising:
a four-sided rack having an interior and a length with spacings along the length of the rack;
a media element handling assembly;
a first segmented panel assembly removably plugged within a spacing of the rack at a first rack length position, the panel assembly having tear-apart first and second panels, each panel having first and second ends, the first ends of the panels being interconnected such that the panels are perpendicular to one another, each panel having an inner surface, wherein the panels are respectively mounted to first and second sides of the rack at the first rack length position with the inner surfaces of the panels facing the rack interior; and
media element housing cells supported on the inner surfaces of the panels such that the housing cells face the rack interior at the first rack length position;
wherein the handling assembly is operable for moving through the rack interior to the first rack length position to manipulate media elements held by the housing cells.

2. The library of claim 1 wherein:
the panel assembly further includes a tear-apart third panel having first and second ends, the first end of the third panel being interconnected to the second end of the second panel such that the second and third panels are perpendicular to one another and the first and third panels are parallel to one another, the third panel having an inner surface, wherein the third panel is mounted to a third side of the rack at the first rack length position with the inner surface of the third panel facing the rack interior; and
a media element player supported on the inner surface of the third panel such that the player faces the rack interior at the first rack length position;
wherein the handling assembly is operable for moving through the rack interior to the first rack length position to load media elements held by the housing cells into the player.

3. The library of claim 1 wherein:
a media element player is supported on the inner surface of the first panel such that the player faces the rack interior at the first rack length position;
wherein the handling assembly is operable for moving through the rack interior to the first rack length position to load media elements held by the housing cells into the player.

4. The library of claim 1 further comprising:
a second segmented panel assembly removably plugged within a spacing of the rack at a second rack length position, the second panel assembly having tear-apart first and second panels each having first and second ends with the first ends being interconnected such that the panels of the second panel assembly are perpendicular to one another, each panel of the second panel assembly having an inner surface, wherein the panels of the second panel assembly are respectively mounted to the first and second sides of the rack at the second rack length position with the inner surfaces of the panels of the second panel assembly facing the rack interior;
media element housing cells supported on the inner surface of the panels of the second panel assembly such that the housing cells face the rack interior at the second rack length position;
wherein the handling assembly is operable for moving through the rack interior to the second rack length position to manipulate media elements held by the housing cells.

5. The library of claim 4 wherein:
the first and second rack length positions are adjacent to one another such that the first and second panel assemblies are adjacent to one another within the rack without touching one another, wherein the rack supports the weight of the panel assemblies without either panel assembly supporting the weight of the other panel assembly.

6. A rack-mounted storage library comprising:
a four-sided rack having a vertically upright, rectangular form formed by top and bottom rack portions and four legs extending therebetween, the legs being placed at respective corners of the top and bottom rack portions, the legs forming a rectangular interior within the rack bounded by four rack sides;
a media element handling assembly movably connected to the rack for moving through the rack interior;
a first segmented panel assembly removably plugged to the rack at a first rack length position, the first panel assembly having tear-apart first and second panels each panel having first and second ends, the first ends of the panels being interconnected such that the panels are perpendicular to one another, each panel having an inner surface, wherein the panels are respectively mounted to first and second sides of the rack at the first rack length position with the inner surfaces of the panels facing the rack interior, the first panel assembly being void of hardware for moving the handling assembly; and media element housing cells supported on the inner surfaces of the panels such that the housing cells face the rack interior at the first rack length position;

wherein the handling assembly moves through the rack interior to move to the first rack length position to manipulate media elements held by the housing cells.

7. The library of claim 6 further comprising:

a second segmented panel assembly removably plugged to the rack at a second rack length position, the second panel assembly having tear-apart first and second panels each having first and second ends with the first ends being interconnected such that the panels of the second panel assembly are perpendicular to one another, each panel of the second panel assembly having an inner surface, wherein the panels of the second panel assembly are respectively mounted to the first and second sides of the rack at the second rack length position with the inner surfaces of the panels of the second panel assembly facing the rack interior;

media element housing cells supported on the inner surface of the panels of the second panel assembly such that the housing cells face the rack interior at the second rack length position;

wherein the handling assembly is operable for moving through the rack interior to the second rack length position to manipulate media elements held by the housing cells.

8. The library of claim 7 wherein:

the first and second rack length positions are adjacent to one another such that the first and second panel assemblies are adjacent to one another without touching one another, wherein the rack supports the weight of the panel assemblies without either panel assembly supporting the weight of the other panel assembly.

* * * * *